United States Patent [19]

Hileman

[11] Patent Number: 4,545,061
[45] Date of Patent: Oct. 1, 1985

[54] SYNCHRONIZING SYSTEM

[75] Inventor: Ronald E. Hileman, Clemmons, N.C.

[73] Assignee: Sylvania Electric Products Inc., Waltham, Mass.

[21] Appl. No.: 226,945

[22] Filed: Sep. 28, 1962

[51] Int. Cl.⁴ .............................................. H04L 7/02
[52] U.S. Cl. ...................................... 375/119; 375/1; 375/2.2; 375/96
[58] Field of Search ................. 328/133, 134; 325/32; 178/5.1; 331/25; 375/1, 2.2, 96, 119

[56]  References Cited
U.S. PATENT DOCUMENTS
2,352,541  6/1944  Harper ................................. 375/119
2,495,946  1/1950  Schuler ............................... 375/119

Primary Examiner—Salvatore Cangialosi

[57]  ABSTRACT

This invention relates generally to electronic communication systems, and more particularly to improved means for maintaining close time synchronism between remote stations in carrier dispersal radio communication systems of the spread spectrum type and other correlation communication systems.

10 Claims, 8 Drawing Figures

SYNCHRONIZING SYSTEM

BACKGROUND OF THE INVENTION

In a known method of radio communication which is gaining acceptance for certain purposes, the energy in a radio frequency carrier is dispersed to occupy a relatively wide band of the RF spectrum. This type of communication has been designated by the terms "carrier dispersal" and "spread spectrum," the former referring to the process by which the energy associated with a carrier is dispersed or distributed over a relatively broad range of frequencies, and the term "spread spectrum" characterizing the waveform which results from this process. When the energy of the carrier is spread over a sufficiently wide frequency spectrum, its individual component frequencies become immersed in the background noise of the transmission channel, preventing the signal from being detected except by a selectively addressed receiver.

According to one known spread spectrum technique, the radio frequency signal is dispersed over a broad band of frequencies by modulating the carrier with a coded sequence of pulses derived from a pattern code generator. The outer limits to which the carrier bandwidth is spread in both directions from its basic frequency is $f_h$ which represents the highest frequency component in the modulation signal, and the individual frequencies which comprise the wideband having a spacing of $f_l$, corresponding to the lowest frequency component of the modulation. An even spacing of the transmitted energy is achieved by providing these frequencies with a coded pulse modulation wherein the pulse width provides the bandspread desired, the repetition frequency of the code establishes the spacing between individual frequency components of the band, and the digit sequence of the code follows a random pattern with a statistically average distribution. Prior to spreading the carrier frequency of the transmitter, the transmitted energy is modulated by any of the known amplitude, frequency, phase, etc., modulation techniques to apply message intelligence to the carrier.

In the addressed receiver, a local code generator capable of generating the same code waveform as is used at the transmitter to disperse the energy in the carrier, modulates a local oscillator separated by the intermediate frequency (IF) bandwidth from the frequency of the transmitted carrier and beats the resultant output against the received signal in a correlation mixer. The output of the mixer is an IF signal containing only the information modulation provided the local code generator is in time synchronism with the received code signal modulation. The energy in the receiver is a maximum when the locally generated code is correlated with or in time synchronism with the received signal, and the energy level decreases if the receiver modulation leads or lags the incoming signal. Accordingly, the receiver necessarily requires a synchronizer to adjust the timing of the receiving pattern generator to maximize the energy in the receiver. The primary functions of the synchronizer are to compensate for timing errors between the transmitter and receiver code pattern generators and for changes in signal path distances which may occur due to variations in ionosphere or doppler velocities.

Synchronization between the transmitter and receiver, and maximum correlation to accomplish reassembly of the energy spread across the frequency spectrum back into a single carrier frequency, is facilitated by employing in both the transmitter and receiver a form of modulation which has a high auto-correlation function. Particularly useful for this purpose are the unique characteristics of the sequences of binary digits known as "maximum length shift register sequences" described in application Ser. No. 741,354 entitled "Selective Calling System" assigned to the assignee of the present application. The so-called "perfect word" outputs of this type of code generator comprise particular binary sequences of "zeros" and "ones" which, when correlated with shifted versions of themselves, provide maximum indication when they are aligned with exactly the same relationship of "one" and "zero" and a relatively minor correlation in all other shifted relationships. These perfect words also have the advantage, which will be referred to in more detail later, that they can, with the aid of suitable logic circuitry, be auto-generated to a sequence length of $2^n - 1$ from an n-stage shift register.

Search for correlation between the transmitted code sequence and the one locally generated at the receiver may be accomplished by delaying the receiver pattern generator so that its code sequence, in effect, slides past the received code sequence in the correlation mixer of the receiver. When, during this sliding process, the two codes reach a point of precise identical digit alignment, all of their frequency and phase components become mutually additive and a relatively large signal appears in the IF amplifier. This signal applies a disabling voltage to the frequency shift circuit of the receiver code generator to restore the basic shift frequency and stop the search, or coarse synchronization, process. Once this coarse synchronism is attained, it is necessary in optimizing the output signal to lock the local code generator to the received signal. This process, which may be termed fine synchronization, is the problem to which the present invention is addressed.

Heretofore, fine synchronization in communication systems of this type has been accomplished by employing two receiver channels, to one of which the output of the local pattern generator is directly applied for local mixing, and to the other of which a time delayed version of the output of the pattern generator is applied. In operation, the basic shifting frequency of the pattern generator is shifted in time so as to increase the energy in the channel having the most energy. This form of synchronization has the disadvantage of requiring two mixers, two IF strips, two detectors and a comparison circuit. And, because two channels are used, the system is inherently subject to drifts in gain in the two channels, since a change in gain will shift the null of the synchronizer off the correlation peak, thereby introducing errors in the system.

Some of the disadvantages of the just-described synchronizing technique have been overcome in another previously used method by time-sharing between one mixer and one IF amplifier. The local code sequence is step advanced for a predetermined period and then step retarded for another period. As a result, the energy in the IF strip is amplitude modulated according to whether the advance step or the retard step results in more energy in the IF amplifier. This IF signal is detected to obtain the amplitude modulation, and the resulting signal is then phase detected, using the advance and retard signal as a reference, to obtain an error signal which is applied through a decision circuit to correct the time shift of the basic shifting frequency of the receiver code generator.

This approach to the fine synchronizing problem has the disadvantage that the bandwidth of the IF amplifier must be sufficiently wide to prevent a phase shift of the amplitude modulation. Increasing the bandwidth, of course, reduces the signal-to-noise ratio. If it is attempted to reduce the bandwidth to improve the signal-to-noise ratio, the leading and trailing edges of the square wave amplitude modulation (a square wave is necessary to the accuracy of the digital phase detectors used in the system) would be severely rounded off since the high frequencies attendent the sharp amplitude excursions would not be passed, with the result that maximum amplitude points would be shifted from their true time.

With an appreciation of the foregoing shortcomings of available synchronizing techniques in correlation communication systems, applicant has as a general object of the present invention to provide an improved means for maintaining close time synchronism, between remotely separated pulse code generators.

A more particular object of the invention is to provide a highly accurate means for maintaining time synchronism in a correlation communication system, wherein gain and phase drifts have little or no effect on the accuracy of the system.

Another object is to provide a synchronizing system for a signal correlation receiver which is capable of operation in a relatively narrow bandwidth to thereby improve the signal-to-noise ratio of the system.

Still another object of the invention is to provide a synchronizer for a signal correlation receiver whose accuracy is maintained over a wide range of received signal amplitudes.

Still another object of the invention is to provide a means for maintaining time synchronism in a correlation communications system receiver which is relatively simple to implement and which has long term stability.

Briefly, these and related objects are achieved by applying the IF output of a time shared correlation mixer through a phase reversing switch to a high "Q" resonant circuit. The phase reversing switch is synchronized with periodic phase advance and retard steps in the local oscillator modulating wave form. The phase of the energy in the high "Q" circuit at the end of each advance and retard cycle is compared in a phase detector with the phase of the energy in a second high "Q" circuit to which the intermediate frequency output of the correlation mixer is directly applied. The output of the phase detector is employed as a correction signal to change the basic clock frequency of the local pattern generator in a direction to effect perfect correlation with the received signal. The high "Q" circuits may be resonant filters of the integrate and dump type described in U.S. Pat. No. 3,056,890, arranged to be quenched at the end of each advance and retard cycle. The correction decision being based on phase information, saturating amplifiers may be employed to amplify the output signals from the high "Q" circuits prior to their application to the phase detector to ensure amplification of the smaller signals, and although the larger signals may be clipped, their phase is not destroyed. This feature gives the synchronizer a high degree of accuracy over a wide range of signal levels.

Other objects, features, and advantages of the invention, and a better understanding of its organization and operation, will become apparent from the following description, reference being had to the accompanying drawings, in which.

Figure 1:
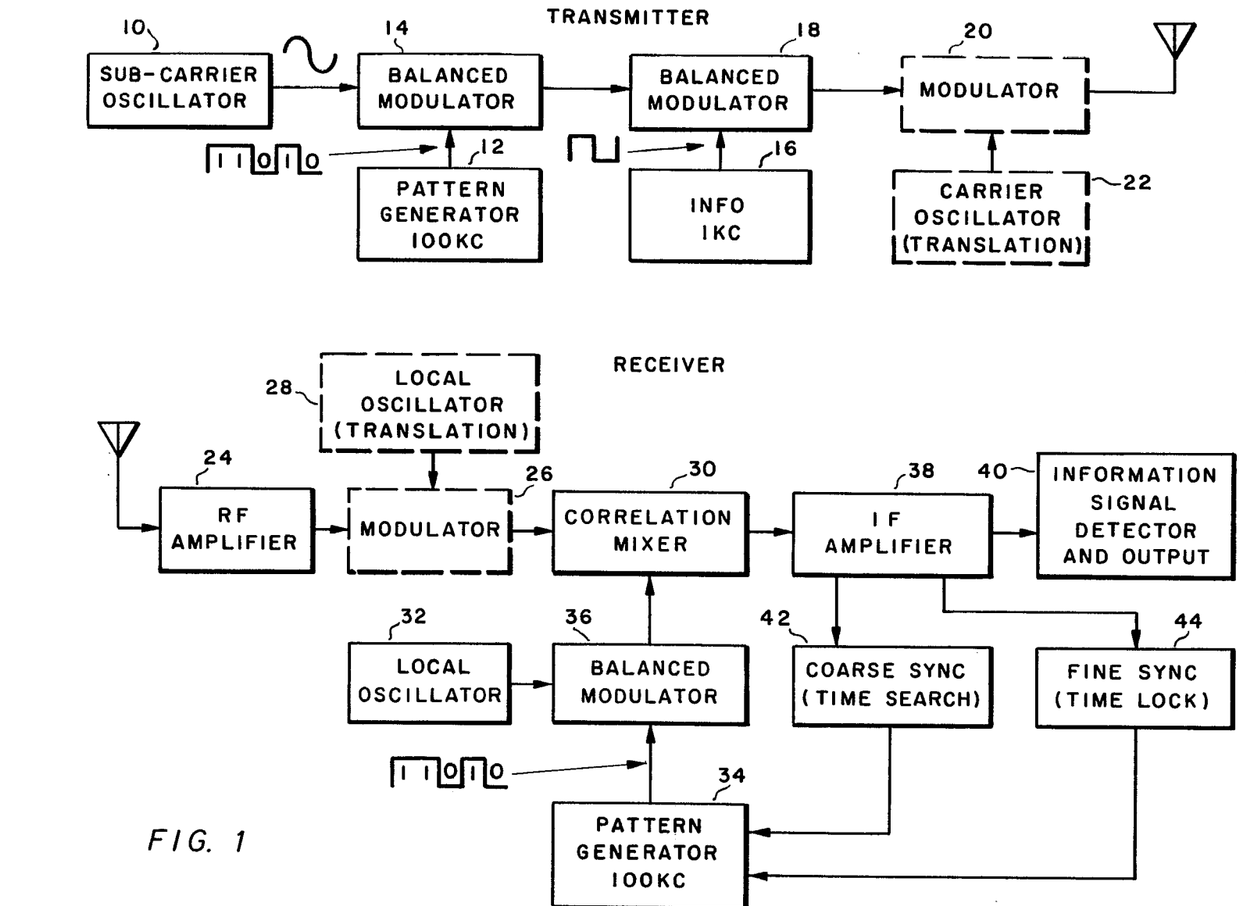
FIG. 1 is a block diagram of the transmitter and receiver of a correlation communication system embodying the invention.

Referring now to FIG. 1, and more particularly to the upper portion of the block diagram, the transmitter portion of a correlation communications system comprises a subcarrier oscillator 10, the output of which is modulated in a balanced modulator 14 by a signal from a pattern generator 12. The output signal from the balanced modulator is further modulated in a second balanced modulator 18 by an information signal from a suitable source 16. The output of balanced modulator 18 may be transmitted directly, or as is more usually the case, is translated to a higher frequency in a modulator 20 by a radio frequency signal from a carrier oscillator 22.

The pattern generator 12, which is timed by a basic clock signal, produces a pre-determined sequence of binary "zeros" and "ones" (or, marks and spaces), preferably of the form known as "maximum length shift register sequences" described in the above-mentioned application Ser. No. 741,354. As is fully explained therein, such sequences can, with the aid of suitable logic circuitry, be auto-generated to a sequence length of $2^n-1$ from a shift register having n stages. For example, with a shift register having nine stages and employing a relatively simple feedback logic, a sequence of $2^9-1$ or 511 digits may be derived. There is no need to apply any particular initial contents to the register with the single exception that it not commence operation with a content of nothing but zeros in all stages. If any one or more of the nine stages contains a "one," the register may be driven through a cycle of 511 shifts, and its output thereafter is a sequence whose format is determined by the connections of the logic to the individual stages of the register. As has been mentioned earlier, such sequences, when auto-correlated with shifted versions of themselves, produce maximum indication when they are in exact digit for digit alignment and minimum indication in other versions. This characteristic may be demonstrated by adding any perfect word to all possible shifted versions of itself. In the single case of perfect alignment, the "ones" and "zeros" correspond exactly. In all other versions, there is one more disagreement than agreement in a digit by digit comparison of the two sequences. If, for example, a perfect word consisting of 511 binary digits is analyzed, there are 255 instances of digit for digit identity and 256 instances of digit for digit dissimilarity in every possible comparison except the one instance where the two words are in perfect digit for digit alignment. It should be pointed out, however, that it is usually unnecessary to compare the entire sequence to establish correlation, it being possible to correlate on only a fraction of the bits in the sequence. The shift register comprising the pattern generator is shifted at a desired rate, 100 kilocycles per second, for example, to produce a modulating waveform of which a portion is illustrated in FIG. 1, and the information source 16, which may also generate a square wave intelligence signal, may, for example, have a basic frequency of one kilocycle per second. While maximum length shift register sequences are particularly adaptable for use in systems of this kind, the pattern generator 12 may take other forms, inasmuch as any sequence with pseudo-random properties can be employed to achieve synchronism between the transmitter and receiver of the system.

The principal components of the receiver, shown in the lower half of FIG. 1, are a radio frequency amplifier 24, the output of which is applied to a modulator 26 having a second input from a translation local oscillator 28 for translating the received signal to a lower frequency prior to further processing. The receiver further includes a correlation mixer 30, having as one of its inputs the output from modulator 26, and as a second input the output of a balanced modulator 36 to which signals from a local oscillator 32 and a pattern generator 34 are applied. The output of the mixer is applied to an intermediate frequency amplifier 38, the output of which is applied in parallel to a signal detector and output circuit 40 and to a coarse synchronizing circuit 42 and a fine synchronizing circuit 44, which together produce signals to control the frequency of pattern generator 34.

Briefly, the receiver picks up the frequency dispersed signal, which after amplification, is applied to the correlation mixer 30 where it is beat against a locally generated signal originating in oscillator 32 and modulated by pulse sequences of the same critical frequency and phase characteristics as those which modulate the transmitted carrier. The general operation of the receiver is similar to that of the conventional superheterodyne except that coded pulsing of the local oscillator takes the place of the conventional local oscillator and the receiver modulating code is synchronized with the transmitter code by the synchronizing circuits. The coarse synchronizer 42 may comprise means for recognizing a high amplitude synchronizing burst in the transmitted code signal and upon receipt thereof initiating operation of pattern generator 34. Alternatively, the search for correlation between the received and locally generated sequence may be accomplished by delaying the local pattern generator so that its sequence, in effect, slides past the received sequence in the mixer. A build-up of energy in the output of the mixer indicates that the two sequences are close to synchronism, and disables the shifting action of the local pattern generator. Once this synchronism has been established, the locally generated frequency and phase patterns are locked to each other in the correlation mixer 30 through phase shifting, sensing and correcting circuitry of the fine synchronizer 44 which is the subject matter of the present invention.

Figure 2:
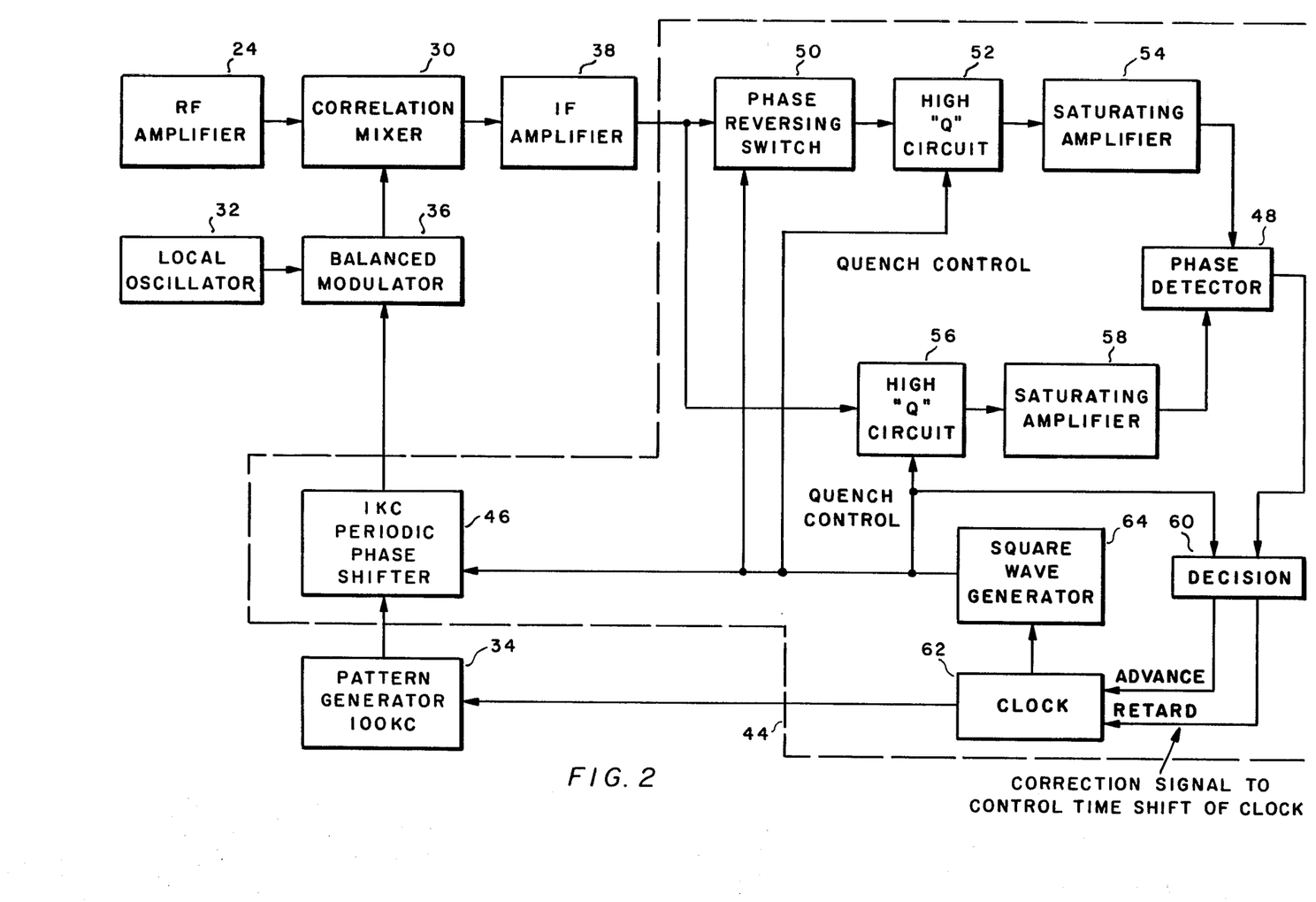
FIG. 2 is a block diagram of the receiver portion of the system of FIG. 1, wherein the synchronizer of the invention is illustrated in greater detail.

Referring now to FIG. 2 wherein the fine synchronizer 44 is shown in greater detail, a periodic phase shifter 46 connected between pattern generator 34 and balanced modulator 36 introduces a phase shift or jitter to the code pulses at a fixed rate determined by a basic clock circuit 62. A general purpose of this phase shifter is to accomplish sampling of the energy level in the IF amplifier, by periodically advancing and retarding the locally generated code sequence by small increments relative to the received code sequence. These samples are continuously detected and compared, the sample which has the higher energy content occurring in the portion of the advance-retard cycle which is closest to correct synchronism. From a comparison of the energies in the two samples, a correction signal is developed which is utilized to adjust the frequency of the pattern generator in the proper direction to achieve maximum correlation.

Figure 3:
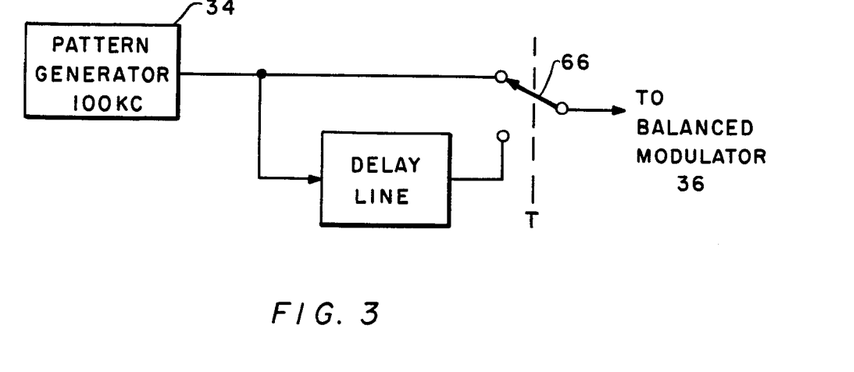
FIG. 3 is a functional block diagram of a periodic phase shifter suitable for use in the system of FIG. 2.

Referring to FIG. 3, the periodic phase shifter 46 of FIG. 2 may functionally be described as comprising a switch 66 which alternately applies to balanced modulator 36 undelayed and delayed versions of the code sequence from pattern generator 34 at a switching rate of 1/T, such that the output is retarded for a period of T/2 and relatively advanced for a period of T/2. As indicated in FIG. 2, which is by way of example only, the switch 66 is operated at a rate of one kilocycle per second from a square wave generator 64. While FIG. 3 illustrates the function of the phase shifter 46 in a schematic fashion, there are a number of ways in which it may be implemented. One method which has been successfully employed consists in using the binary output of pattern generator 34 to steer a bistable multivibrator and advancing and retarding the trigger voltage of the multivibrator at a 1/T rate to produce the desired phase jitter in the output pattern of the multivibrator. In another successfully operated technique, the phase shifter 46 is connected in the drive circuit of the pattern generator 34 (rather than in the output circuit as depicted in FIG. 2) in which a tuned circuit is used to advance and retard the drive pulses from clock 62. It will be appreciated that a phase shifting or jittering of the drive pulses will cause a corresponding jitter to the code sequence generated by the pattern generator. This tuned circuit, may, for example, be tuned above the drive frequency to an extent which introduces a 36° advance in the phase of the drive pulses, and when a capacitor is switched across the circuit it is tuned below the drive frequency sufficient to cause a 36° delay in the phase of the drive pulses. With these 36° advance and retard phase shifts, a switching rate of one kilocycle, and a pattern generator code frequency of 100 kilocycles, the net effect of the periodic phase shifting is that the code sequence from pattern generator 34 is retarded by one-tenth of a code bit time during approximately T/2, or 50 bits of the code sequence, and advanced by one-tenth of a code bit time during the next 50 bits of the code sequence.

Whichever of the above-described techniques of introducing phase jitter is employed, the result is a variation in amplitude of the intermediate frequency signal in amplifier 38. These variations are compared by applying the IF signal in parallel through two separate signal paths to a phase detector 48. One path includes a phase-reversing switch 50, a high "Q" resonant circuit 52, in which the signal is integrated, and a saturating amplifier 54. In the other path the phase reversing switch is omitted, and thus includes only a second high "Q" circuit 56 and a saturating amplifier 58. The high "Q" circuits 52 and 56, which may be tuned filters of the integrate and dump type described in the above-mentioned U.S. Pat.

No. 3,056,890, are periodically quenched in synchronism by quench control signals derived from square wave generator 64, the pulse rate of which is synchronously related to the bit rate of pattern generator 34 by virtue of the basic clock circuit 62. With the signal in the path not having a phase reversing switch used as a phase reference, the phase detector 48 is operative to indicate whether the code pattern generated by pattern generator 34 leads or lags the received code sequence, or whether the two are in perfect synchronism. The output of the phase detector is applied to a decision circuit 60 which generates either an advance or retard correction signal to vary the basic frequency of the clock 62, or the correction may be applied directly to pattern generator 34.

Figure 4:
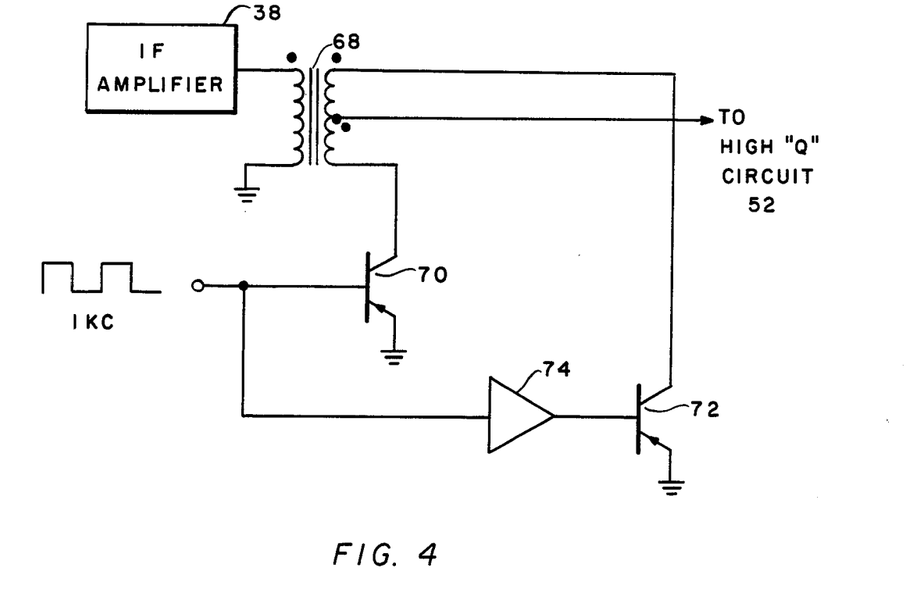
FIG. 4 is a circuit diagram of a phase-reversing switch useful in the synchronizer of FIG. 2.

Referring to FIG. 4, the phase reversing switch 50 of the circuit of FIG. 2 may comprise a balanced transformer 68 having a center-tapped secondary winding, the end terminals of which are respectively connected through transistors 70 and 72 to ground. The square wave synchronizing signal from square wave generator 64 is applied directly to the base of transistor 70 and through an inverter 74 to the base of transistor 72 to thereby alternately saturate one transistor and cut off the other. This action has the effect of alternately grounding opposite ends of the transformer 68 and consequently reversing the phase of the output signal taken from the center tap of the transformer synchronously with the phase jitter produced by the periodic phase shifter 46.

The output from the phase reversing switch 50 is applied to a first high "Q" circuit 52, and the output of the IF amplifier 38, without the above-described phase reversal, is applied to a second high "Q" circuit 56. The circuits 52 and 56 are preferably matched filters tuned to the IF signal whereby energy builds up in the filter in phase with the applied energy to integrate the applied energy over a prescribed interval of time. As will be described more fully hereinafter, the energy stored in the matched filters is dumped at the end of each advance and retard cycle of the periodic phase shifter 46. An integrate and dump filter of the type described in U.S. Pat. No. 3,056,890 is particularly suitable for the high "Q" circuits 52 and 56.

The output signals from circuits 52 and 56 are respectively applied to saturating amplifiers 54 and 58 which have gain characteristics such that the smallest signals from the high "Q" circuits are amplified to a useful level and the larger signals clipped without destroying their phase. Clipping of the larger signals is not objectionable since the correction decision of the synchronizer is based on phase information alone, not amplitude.

Figure 5:
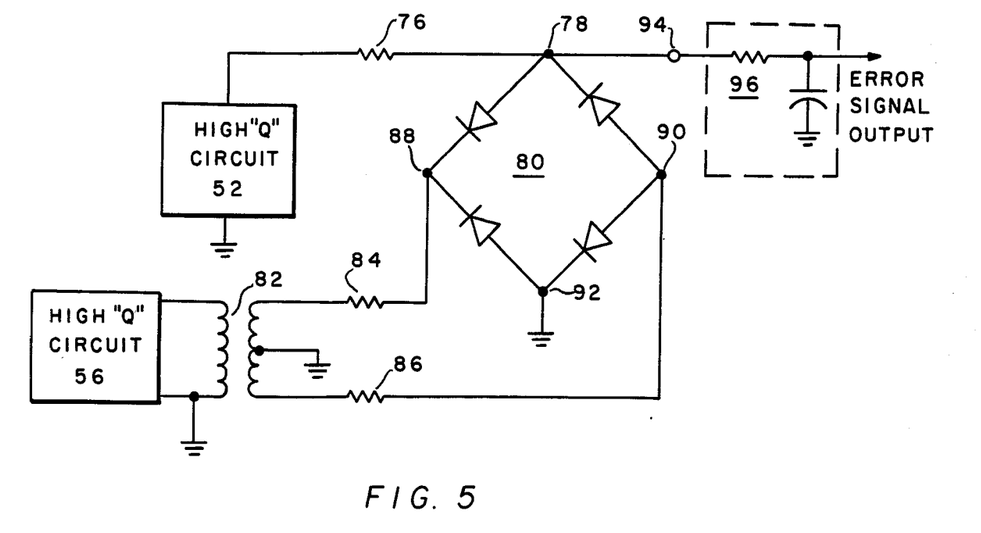
FIG. 5 is a circuit diagram of a phase detector useful in the synchronizer of FIG. 2.
Figure 6:
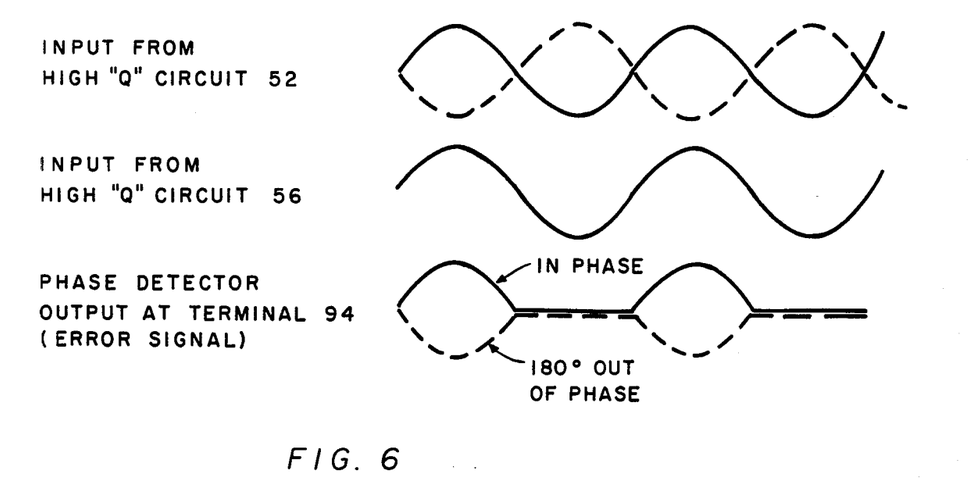
FIG. 6 illustrates the input and output waveforms of the phase detector of FIG. 5.

The amplified signals in the two signal channels are applied to a phase detector 48, which may be of the conventional bridge type illustrated in FIG. 5. The bi-phase, sinusoidal signal from circuit 52 is applied through an isolating resistor 76 to one terminal 78 of the diode bridge configuration 80. The sinusoidal signal from circuit 56, which establishes a reference phase, is applied through a balanced transformer 82 having a grounded center tap on its secondary winding. The terminals of the secondary winding are respectively connected through limiting resistors 84 and 86 to terminals 82 and 90 of the bridge, the remaining terminal 92 of the bridge being grounded as shown. The diode bridge in this configuration acts as a shunt-type switch which is controlled by the signal from circuit 56 to short the signal from circuit 52 to ground during alternate half cycles. As shown in FIG. 6, when the signals from the two high "Q" circuits 52 and 56 are in phase, terminal 88 is positive and terminal 90 is negative when terminal 78 is positive, thereby back-biasing the diodes (opening the switch) and allowing the positive half cycle of the signal from circuit 52 to be applied to the output terminal 94. Conversely, terminal 88 is negative and terminal 90 is positive when terminal 78 is negative to thereby forward-bias the diodes (close the switch) to short circuit the signal from circuit 52 to ground during its negative half cycle. However, when the phase of the signal from circuit 52 is reversed with respect to the reference signal from circuit 56, terminal 88 is positive and terminal 90 is negative when terminal 78 is negative, so as to open the switch to allow the negative half cycle of the signal to be applied to terminal 94; and when terminal 88 is negative and terminal 90 is positive, terminal 78 is positive thereby forward-biasing the diodes to short the positive half cycle of the signal to ground. The dotted waveforms in FIG. 6 depict the situation when the signal from circuit 52 is 180° out of phase with the signal from circuit 56. For convenience, the signals applied to the phase detector are illustrated as being sinusoidal, but it will be appreciated that they will approach a square wave form should clipping occur in the saturating amplifiers. The error signal output from the bridge 80 is applied to a simple low pass filter 96 to remove noise and higher frequency components from the error signal. The filtered signal, the nature of which will be further described hereinafter, is applied to a decision circuit 60 which determines whether the basic frequency of clock 62 should be advanced or retarded to achieve optimum correlation. The nature of the decision circuit will be further described in connection with the description of the operation of the synchronizer.

Having considered the functions of the several portions of the circuit of FIG. 2, the operation of the overall circuit will now be described. The clock circuit 62 drives the pattern generator 34 which produces a binary code sequence which is identical in structure to the code sequence generated in the transmitter of the system. This code sequence is step advanced for one-half period of a one kilocycle per second square wave and then step retarded for one-half period of the same square wave by the periodic phase shifter 46. The phase shifter is controlled by a square wave signal from generator 64, which, in turn, is synchronized with clock 62. The locally generated binary code is applied to balanced modulator 36 to modulate the CW output of the local oscillator 32. The code sequence modulated local oscillator signal is mixed with the received signal in the correlation mixer 30. The received and locally generated signals are identical in modulation content with the exception that the received signal also contains information modulation. The resulting intermediate frequency signal, after amplification, is applied to the high "Q" circuit 56 and through phase reversing switch 50 to the other high "Q" circuit 52. Both of the high "Q" circuits are tuned to the intermediate frequency and energy builds up in them in phase with the applied energy to effect an integration of the energy. When the phase-reversing switch 50 is operated, the energy applied to circuit 52 will be out of phase with the signal from IF amplifier 38 and therefore effectively subtracts from the energy in circuit 52.

Figure 7:
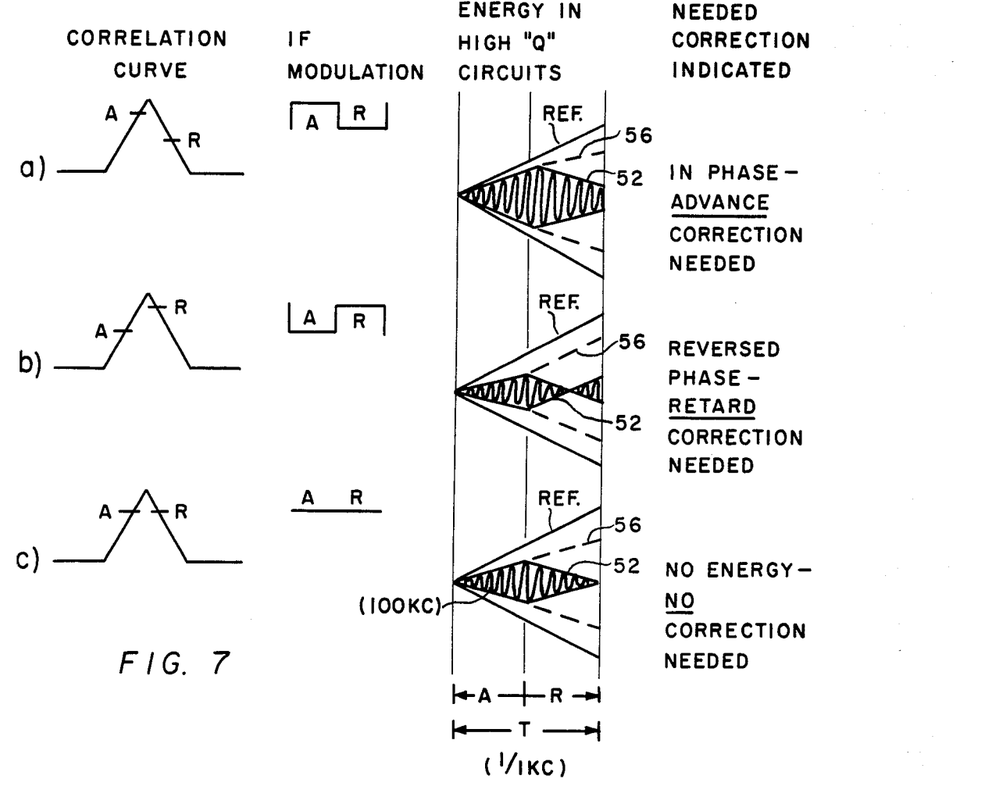
FIG. 7 is a graphic representation of the correlation signals of the code sequences generated in the receiver, and of the attendant intermediate frequency amplitude modulation and stored energy condition of the high "Q" circuits of the synchronizer.

With reference now to FIG. 7, one operational cycle of the synchronizer will be described. Under control of square wave generator 64, the local code pattern is step advanced for a period of T/2 by phase shifter 46, and the phase reversing switch 50 is set to its non-reversing condition for the same period T/2. In the present example, where the frequency of the square wave control signal is one kilocycle per second, T is one millisecond. Assuming that the high "Q" circuits 52 and 56 are initially at rest, the energy in the two circuits builds up in proportion to the energy in the IF signal. The local code pattern is then step retarded for a period T/2, and during the same period the switch 50 is set to reverse the phase of the signal from IF amplifier 38. During the just-described period, energy is subtracted from high "Q" circuit 52 in proportion to the energy coming from the mixer at that time, and high "Q" circuit 52 continues to integrate the applied energy. Since the time spent with the pattern advanced is equal to that spent retarded, the phase of the energy in high "Q" circuit 52 at the end of the phase jitter or synchronizer cycle T gives an indication of the correction needed to move the local code pattern toward perfect time synchronism with the received code pattern.

Referring to the correlation curve plotted in FIG. 7(*a*), if the local code pattern happens to lag the received code pattern, the advance phase jitter step will move the local code pattern closer to peak phase correlation (as indicated by "A" on the correlation curve) and the retard step will move the local code pattern further away from peak correlation (indicated by "R" on the correlation curve). In other words, for the situation described, more energy would be received during the advance step than during the retard step. The advance-retard cycle square wave modulates the energy in IF amplifier 38 in the manner shown in the second column of FIG. 7, the duration of each modulating step being sufficient to encompass 50 bits of a code sequence having a basic frequency of 100 kilocycles per second. As shown in the third column of FIG. 7(*a*), as a result of this amplitude modulation of the IF signal energy, and the synchronization of the phase-reversing switch 50 therewith, the energy in high "Q" circuit 52 would build up during the advance step at a rate slightly lower than the maximum rate for the case of perfect correlation, and would be reduced at an even slower rate during the retard step, since less energy would be applied when the phase is reversed. Consequently, the energy stored in the integrator 52 at the end of the synchronizing period T is still in phase with the signal from the mixer, indicating that an advance correction is needed. During this same time period, the energy in the reference integrator 56, represented by the dotted curve labelled 56, builds up at the same rate as in integrator 52 during the advance step, and continues to build up at a slightly slower rate during the retard portion of the cycle.

Referring now to FIG. 7(*b*), if the locally generated code pattern happens to lead the received code pattern, more energy would be received during the retard step than during the advance step as indicated by the locations of "A" and "R" on the correlation curve. This results in a reversal of the phase of the amplitude modulation of the energy in the IF amplifier, as indicated in the second column of FIG. 7, and in this case the energy in integrator 52 builds up at a relatively slow rate during the advance step, since very little energy is applied, and is reduced at a rapid rate during the retard step, since more energy is applied when the phase is reversed. Indeed, as shown in the third column of FIG. 7(*b*), the energy is subtracted during the retard step at such a rapid rate that the phase of the stored energy is reversed; i.e., at the end of the synchronizing period T, the phase of the energy in integrator 52 is opposite to that of the signal from mixer 30, indicating that a retard correction is needed. As indicated by the dotted curve, during this same period, the energy in reference integrator 56 builds up at the same rate as the energy in circuit 52 during the advance step, and continues to build up at a much more rapid rate during the retard step.

Referring to FIG. 7(*c*), if the locally generated code pattern happens to be in perfect correlation with the received code pattern, equal amounts of energy are received during the advance and retard steps; consequently, there is no amplitude modulation of the IF energy, and the energy builds up in integrator 52 at the same rate during both the advance and retard steps. As a result, there is no energy stored in high "Q" circuit 52 at the end of the synchronizing cycle, indicating that no correction is needed. Of course, the energy in integrator 56 builds up at a constant rate throughout the synchronizing period.

To insure that there is no energy in the storage circuits 52 and 56 at the start of a synchronizing period, both circuits are quenched or dumped at the end of each period T by a control signal from squarewave generator 64. The energy dumped or released from circuits 52 and 56 at the end of each synchronizing period, T, are applied through saturating amplifiers 54 and 58, respectively, to respective input terminals of the phase detector 48.

Referring again to FIG. 6, if the phase of the energy from circuit 52 is in phase with the energy from circuit 56, the output from phase detector 48 will be a series of positive pulses indicating that an advance correction is needed. Should the signals be clipped by the saturating amplifiers, the waveforms of FIG. 6 would be more nearly square waves rather than sine waves. If the phase of the energy from circuit 52 is opposite to that of the energy from circuit 56, a train of negative pulses will be produced by the phase detector, indicating that a retard correction is needed. If no energy is applied to the phase detector from circuit 52, there is no output from the phase detector, indicating that no correction is necessary.

Figure 8:
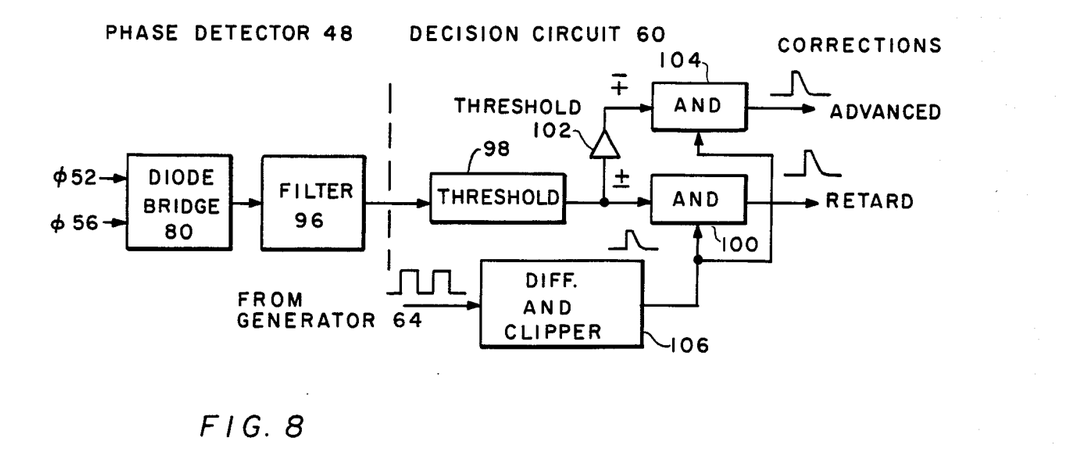
FIG. 8 is a block diagram of the decision circuit of the synchronizer of FIG. 2.

The output signals from phase detector 48 are filtered to remove noise and higher frequency components and applied to a decision circuit 60, a form of which is shown in the block diagram of FIG. 8. As shown, the decision circuit may comprise a threshold circuit 98 whose output is connected directly to a first "AND" gate 100 and through an inverter 102 to a second "AND" gate 104. The square wave signal from generator 64 is differentiated and clipped in a differentiating and clipping circuit 106 and applied as a train of positive gating pulses to the two "AND" gates concurrently with the end of each phase jitter synchronizing cycle. The threshold circuit 98 may comprise a PNP transistor having its emitter electrode connected to ground and its collector electrode connected to a source of negative potential and to "AND" gate 100 and to inverter 102. With these connections, a train of positive pulses from phase detector 48 will cut off the transistor causing a negative voltage signal to be applied to "AND" gate 100. This negative voltage signal will not enable "AND" gate 100, but when it is inverted and applied as a positive voltage signal to "AND" gate 104, the latter is opened to allow a positive advance correction pulse to be applied to clock 62 (or pattern generator 34) to cause the local code pattern to be time advanced by a given phase increment. If on the other hand, a negative series of pulses from phase detector 48 is applied to the base electrode of the transistor in the threshold circuit, a positive voltage signal will be applied to "AND" gate 100 to allow a positive retard correction pulse to be applied to clock 62 or pattern generator 34. The "AND" gate 104 will, of course, be disabled since the positive voltage signal will be inverted prior to its being applied to the gate.

The advance and retard correction pulses may be utilized in a variety of ways to shift the phase of the local code pattern, depending upon the nature of the clock circuit 62 and/or the pattern generator 34. For example, the advance and retard pulses may be filtered and applied as steering pulses to a voltage variable capacitor in a voltage controlled oscillator (clock 62) to vary slightly the drive frequency to the pattern generator 34. This slight change in drive frequency will produce a relatively larger change in phase over a number of bits of the code pattern. As another example, the pattern generator 34 may include in its input circuit a digital frequency divider chain to reduce the frequency of the clock circuit 62 prior to application to the pattern generator. In this type of system, advance pulses may be inserted between the drive pulses to effect an advance phase shift of the drive to the pattern generator, and the retard pulses may be applied to a gate to effectively eliminate a drive pulse thereby effecting a retard phase shift. In still another arrangement, the advance and retard pulses may be applied to control the direction of counting of a ring counter in a digital phase shifter of the type described in U.S. Pat. Nos. 2,923,891 and 2,972,109, which may be connected in the input circuit of pattern generator 34, to thereby shift the phase of the drive pulses to the generator accordingly.

By time-sharing the signal channel including high "Q" circuit 52, gain and phase drifts in other portions of the circuit will not shift the null of the phase detector output. The only component that can cause a null shift is the phase-reversing switch 50, and its drift can be minimized by careful design. For example, the center tapped secondary of transformer 68 may be made bifilar to essentially eliminate unbalanced drift. If matched filters 52 and 56 have a sufficiently high "Q", the noise bandwidth of the system closely approaches the theoretical minimum of $\Delta f = 1/T$, where $\Delta f$ is the bandwidth and T is the synchronizing period. Filters of the type described in the aforesaid U.S. Pat. No. 3,056,890 have a very high "Q". The system has the further advantage that since the decision as to advance and retard correction is based on phase, little information is lost by post integration amplitude clipping. This permits the use of saturating amplifiers between the high "Q" circuits and the phase detector to amplify the smallest signals to a usable level and clip the larger signals without destroying their phase. This, in turn, permits the synchronizer to maintain its accuracy over a wide range of signal levels. Accordingly, the synchronizer combines the features of high accuracy and narrow bandwidth with wide dynamic range, long term stability and easily implemented circuits.

A communication system has been described which features a preferred embodiment of the invention. It is to be understood, however, that the scope of the invention is not limited to such a system or to the particular features and the embodiment described, or to the specific frequencies suggested. As has been mentioned, it is not necessary that the described maximum length shift register sequences be used to realize the advantages of the invention. Moreover, use of the described synchronizing technique is not limited to the described spread spectrum communication system, but is equally applicable to frequency hopping and analog systems. Accordingly, it is intended that the scope of the invention be limited only by the appended claims.

What is claimed is:

1. In an electronic signal system utilizing at least two separately generated but identical signals, means for maintaining correlated synchronism between said signals which comprises the combination of: means for periodically shifting the phase of one of said signals relative to the other, means for comparing said periodically shifted signal with the other; a phase detector having first and second input terminals, first and second signal paths connected from said comparing means and to respective input terminals of said phase detector, said first signal path including periodically phase-reversing integration means and said second signal path including a reference integration means, and means responsive to the output of said phase detector for adjusting the phase of one of said signals in a direction to maintain correlation.

2. In the receiver of a communication system, means for synchronizing a received coded signal with a locally generated similarly coded second signal which comprises: a comparison circuit, means for applying said received coded signal to said comparison circuit, means for periodically shifting said second coded signal in phase and applying it to said comparison circuit, a phase detector having first and second input terminals, first and second signal paths connected from said comparison circuit to respective input terminals of said phase detector, said first signal path including means for periodically reversing the phase of the output signal of said comparison circuit and means for subsequently integrating said output signal, and said second signal path including a reference integrating means, and means responsive to the output of said phase detector for adjusting the phase of said second coded signal in a direction to maintain correlation with said received coded signal.

3. In a communication system including means for separately generating at least two independent identical coded signals, a comparison circuit, means for applying said coded signals to said comparison circuit, and time searching means responsive to the output of said comparison circuit to bring one of said coded signals into time synchronism with the other, means for maintaining time synchronism between said two coded signals which comprises the combination of: means for periodically shifting the phase of one of said coded signals relative to the other, a phase detector having first and second input terminals, first and second signal paths connected from said comparison circuit to respective input terminals of said phase detector, said first signal path including means for reversing the phase of the output signal of said comparison circuit in synchronism with said phase-shifting means and a first resonant integrating circuit tuned to the intermediate frequency of said comparison circuit, said second signal path including a second resonant integrating circuit tuned to the aforesaid intermediate frequency, and means responsive to the output of said phase detector for adjusting the time position of one of said coded signals toward perfect synchronism with the other.

4. In a binary code pulsed carrier communication system receiver including a radio frequency energy reception circuit, a mixer circuit connected to said reception circuit, an intermediate frequency amplifier connected to said mixer, a local oscillator, a local binary code pulse generator, a modulator, means connecting said local oscillator and pulse generator to said modulator, means connecting the output of said modulator to said mixer, and time searching means responsive to the output of said intermediate frequency amplifier for synchronizing said local pulse code with a received pulse code having the same structure as the local pulse code, apparatus for maintaining time synchronism between said two sequences which comprises the combination of: a phase-shifting circuit arranged periodically to change the phase timing of the output of said local pulse generator, a phase detector having first and second input terminals, first and second signal paths connected between the output of said intermediate frequency amplifier and respective input terminals of said phase detector, said first signal path including a phase-reversing switch synchronized with said periodic phase-shifting circuit and a first matched filter tuned to the intermediate frequency of said mixer, said second signal path including a second matched filter also tuned to said intermediate frequency, and a control circuit operative in response to signals from said phase detector for adjusting the time position of the output of said pulse generator.

5. Apparatus in accordance with claim 4 wherein said first and second matched filters are integrate and dump filters, and means for quenching said filters at the end of each cycle of said phase reversing switch.

6. Apparatus in accordance with claim 5 wherein said phase-reversing switch comprises a transformer having a primary winding and a center-tapped secondary winding, means coupling the output of said local pulse generator to said primary winding, and means for alternately connecting the terminals of said secondary winding to a point of reference potential.

7. Apparatus in accordance with claim 6 wherein said first and second signal paths further include respective first and second saturating amplifiers for respectively amplifying the smaller signals and clipping the larger signals from said first and second integrate and dump filters.

8. Apparatus in accordance with claim 7 wherein said control circuit comprises a clock circuit for driving said pulse generator, and a decision circuit operative in response to output signals from said phase detector to shift the frequency of said clock.

9. Apparatus in accordance with claim 7 wherein said control circuit comprises a source of drive pulses for said pulse generator, and a decision circuit operative in response to output signals from said phase detector to shift the phase of said drive pulses.

10. In a radio communication system including a transmitter for producing a carrier signal modulated with a pulse code sequence, and a receiver including means for intercepting said carrier signal, means for providing a local radio frequency signal, means for modulating said local signal with a pulse code sequence identical in structure to the modulation of the carrier signal, and a common mixer circuit for comparing said intercepted and locally modulated signals, apparatus for maintaining time synchronism between said intercepted and local code sequences which comprises: means for periodically shifting the phase of said local sequence, a phase detector having first and second input terminals, first and second signal paths connected between said mixer circuit and respective input terminals of said phase detector, said first signal path including a phase-reversing switch synchronized with said means for periodically shifting the phase of said local sequence, and a first resonant filter tuned to the intermediate frequency of said mixer, said second signal path including a second resonant filter also tuned to said intermediate frequency, means for quenching said first and second filters at the end of each cycle of said phase-reversing switch, and a control circuit operative in response to the signal output of said phase detector for adjusting the time position of said local sequence.

* * * * *